H. F. SCHRODER.
JOURNAL BEARING MOLD.
APPLICATION FILED JUNE 18, 1909.

974,529.

Patented Nov. 1, 1910.
3 SHEETS—SHEET 1.

Witnesses:
Wm. Geiger
H. M. Munday

Inventor:
Herman F. Schroder
By Munday, Evarts, Adcock & Clarke.
Attorneys

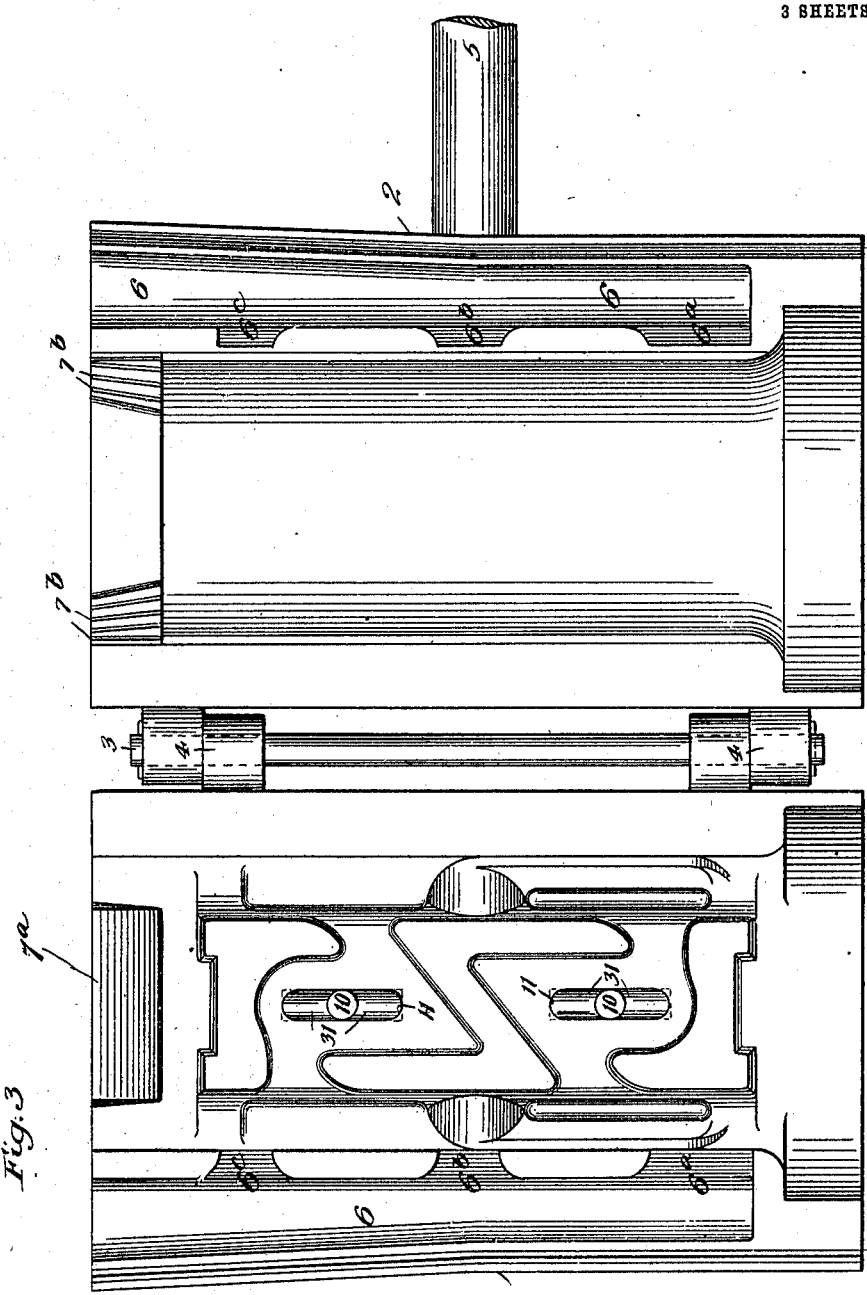

H. F. SCHRODER.
JOURNAL BEARING MOLD.
APPLICATION FILED JUNE 18, 1909.
974,529.
Patented Nov. 1, 1910.
3 SHEETS—SHEET 3.
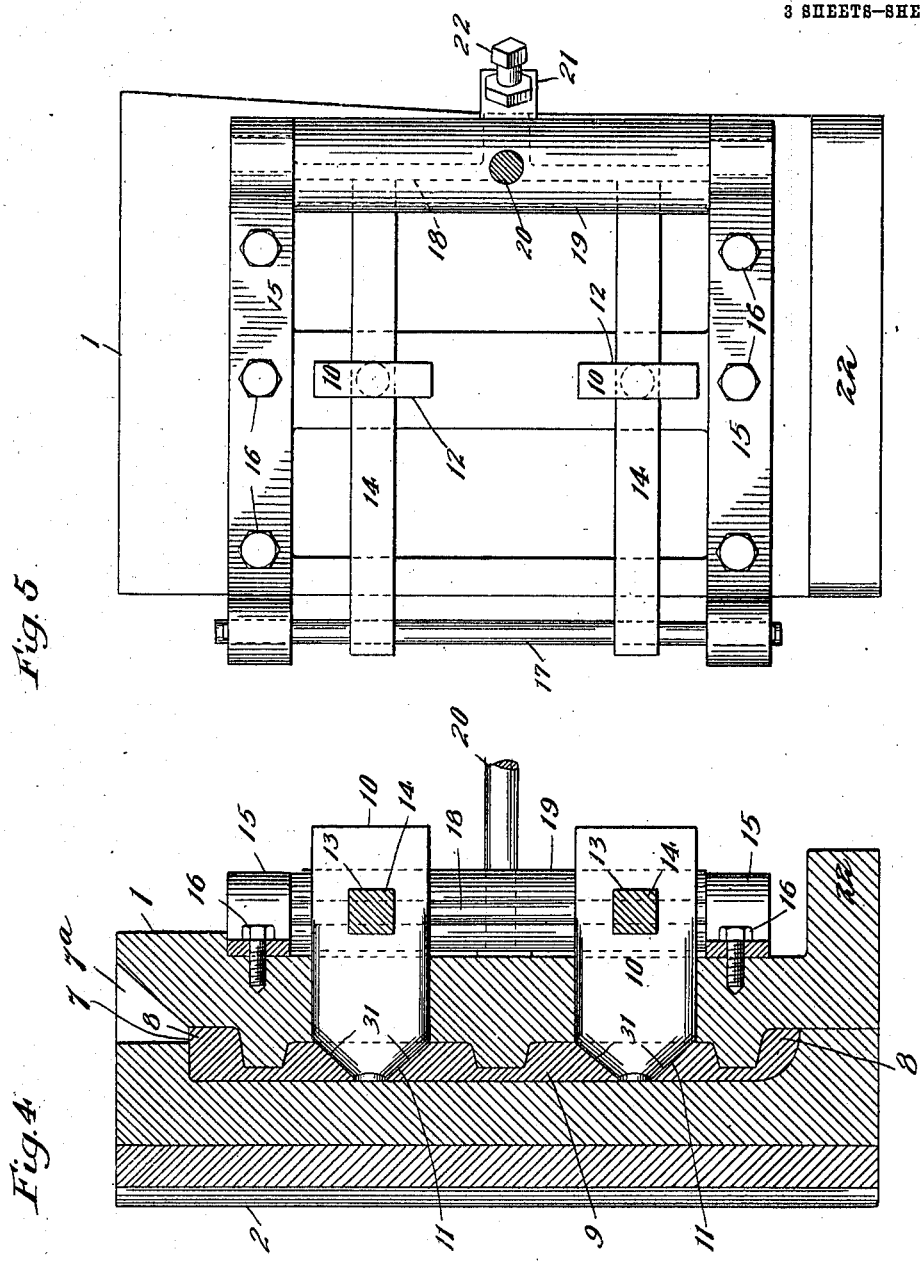
Witnesses:
Inventor:
Herman F. Schroder.
By Munday, Evarts, Adcock & Clarke.
Attorneys

UNITED STATES PATENT OFFICE.

HERMAN F. SCHRODER, OF BERWYN, ILLINOIS, ASSIGNOR TO WILLIAM H. MINER, OF CHICAGO, ILLINOIS.

JOURNAL-BEARING MOLD.

974,529.  Specification of Letters Patent.  Patented Nov. 1, 1910.

Application filed June 18, 1909. Serial No. 502,869.

*To all whom it may concern:*

Be it known that I, HERMAN F. SCHRODER, a citizen of the United States, residing in Berwyn, in the county of Cook and State of Illinois, have invented a new and useful Improvement in Journal-Bearing Molds, of which the following is a specification.

My invention relates to improvements in molds for manufacturing soft bearing metal liners or shells for journal bearings for car and other axles.

The object of my invention is to provide a journal bearing mold suitable for manufacturing the soft bearing metal shells or liners of the journal bearing forming the subject of the Muhlfeld Patent No. 904,634, and in which the soft metal bearing shell or liner may be readily removed from the mold without injury thereto.

My invention consists in combination with the opening and closing members of the mold, preferably hinged together, of movable core members for forming the tapering oil cavities in the liner or bearing shell, and means for operating these movable core members to eject the soft metal bearing shell or liner from the mold.

It further consists in the novel construction of parts and devices and in the novel combinations of parts and devices herein shown and described.

Figure 1:
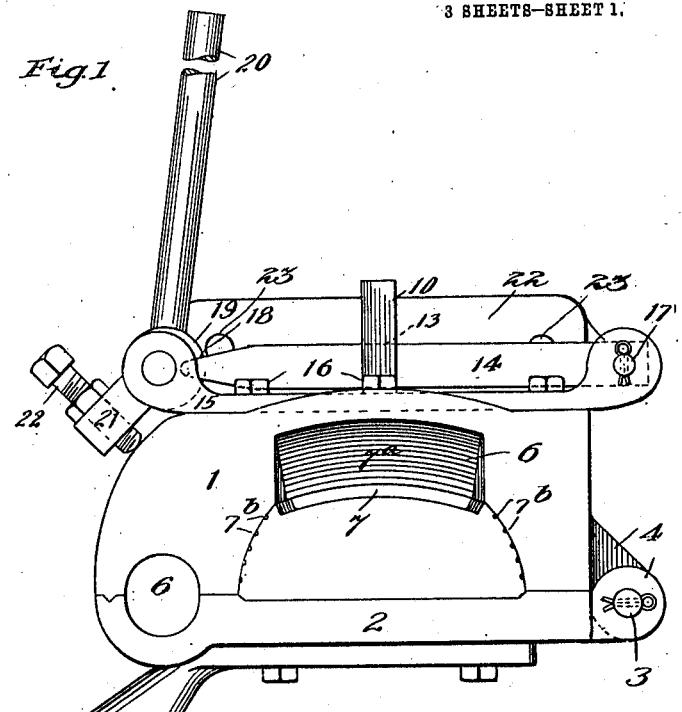
Figure 2:
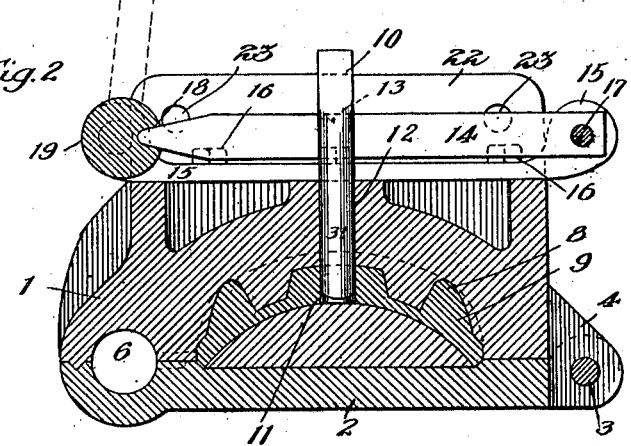

In the accompanying drawing forming a part of this specification, Figure 1 is a plan view of a journal bearing mold embodying my invention. Fig. 2 is a horizontal section showing certain parts in plan. Fig. 3 is a detail front view showing the two halves or members of the mold open and Fig. 4 is a central, vertical longitudinal section. Fig. 5 is a side elevation.

In the drawing, 1, 2 are the two shells, halves or members of the mold connected together by a hinge pin 3 extending through suitable ears or lugs 4 on the two shells or members of the mold. The movable member 2 of the mold is provided with a handle 5 for swinging it horizontally open and closed. The fixed or stationary member 1 and hinged member 2 of the mold are furnished with a suitable gate 6 through which the Babbitt or other soft bearing metal may be poured into the mold the gate being upright and partially formed in each member of the mold and extending from the top to near the bottom thereof and communicating with the interior of the mold through a plurality of horizontally extending runners $6^a$ $6^b$ $6^c$ at different levels, one near the bottom of the mold, one near the middle and one at the upper portion thereof. The two members of the mold are also provided with the customary vent 7 at the upper portion thereof, having the usual telltale or enlargement $7^a$ and also preferably with fine vent grooves $7^b$.

The member of the mold which forms the ribs or thickened portions 8 on the upper face of the soft metal liner or bearing shell 9, which is preferably the stationary member, is provided with movable core members 10 which form the flaring lubricant cavities 11 in the soft metal bearing shell or liner 9. These movable core members 10 have widely flaring ends 31 and are mounted in suitable sockets 12 in the mold member 1. Each of these movable core members 10 is furnished with a square or rectangular opening 13 through which is inserted a lever 14 pivotally connected at one end to straps 15 secured to the mold member 1 by screws or bolts 16. The levers 14 are hinged to the straps 15 by a pin 17. The levers 14 at their ends fit loosely in a notch or groove 18 of a roller or rock shaft 19 so that the levers will be operated by the turning of the rock shaft. The rock shaft 19 is journaled upon the straps 15 and is provided with an operating lever 20 and an adjusting arm 21 furnished with an adjusting screw 22 which engages the mold member 1 and thus limits the outward movement of the adjustable core members 10.

After the soft bearing metal shell or liner 9 has been cast in the mold, the movable member 2 of the mold is swung open and then the lever 14 which operates the movable core members is swung to the right of the position shown in Fig. 1, thus turning the rock shaft 19 to the right and moving the core carrying levers 14 inward and thereby forcing the movable core members 10 inward and thereby causing the same to force the soft metal bearing shell or liner 9 out of the mold member 1 without injuring the liner.

The upright stationary member 1 of the mold is provided with a base or flange 22 at its lower end furnished with holes 23 for bolting it securely to a foundation plate and thus enable the upright hinged member 2 of the mold to be swung horizontally open by its handle or lever 5.

I claim:—

1. In a mold for manufacturing journal bearing liners, the combination with a pair of opening and closing mold members having an upright gate extending lengthwise of the mold and provided with a plurality of horizontally extending runners communicating with the interior of the mold at different levels, of a pair of movable cores mounted to reciprocate through one of said mold members and eject the soft metal liner cast therein therefrom, said movable cores engaging said liner one above and the other below its middle, substantially as specified.

2. In a mold for manufacturing journal bearing liners, the combination with a pair of opening and closing mold members having an upright gate extending lengthwise of the mold and provided with a plurality of horizontally extending runners communicating with the interior of the mold at different levels, of a pair of movable cores mounted to reciprocate through one of said mold members and eject the soft metal liner cast therein therefrom, said movable cores engaging said liner one above and the other below its middle, a pair of core levers engaging said cores and a grooved rock shaft and lever for operating said core levers, substantially as specified.

3. In a mold for manufacturing journal bearing liners, the combination with a pair of opening and closing mold members, of a pair of movable cores mounted to reciprocate through one of said mold members and eject the soft metal liner cast therein therefrom, a pair of core levers engaging said cores and a grooved rock shaft and lever for operating said core levers, said rock shaft having an adjusting arm and adjusting screw, substantially as specified.

4. A journal bearing mold consisting in a pair of opening and closing mold members having an upright gate extending lengthwise of the mold and provided with a plurality of horizontally extending runners communicating with the interior of the mold at different levels, one of said mold members having a movable core adapted to reciprocate therethrough and serve as a means for ejecting or discharging the journal bearing liner cast therein from the mold, said mold members being hinged together on an upright axis, and one of said mold members having means for securing it stationary in an upright position, substantially as specified.

5. A journal bearing mold consisting in a pair of opening and closing mold members having an upright gate extending lengthwise of the mold and provided with a plurality of horizontally extending runners communicating with the interior of the mold at different levels, one of said mold members having a movable core adapted to reciprocate therethrough and serve as a means for ejecting or discharging the journal bearing liner cast therein from the mold and an operating lever for said movable core, said mold members being hinged together on an upright axis, and one of said mold members having means for securing it stationary in an upright position substantially as specified.

6. A journal bearing mold consisting in a pair of opening and closing mold members, one of said mold members having a movable core adapted to reciprocate therethrough and serve as a means for ejecting or discharging the journal bearing liner cast therein from the mold, and an operating lever, having an adjusting arm and an adjusting screw, for actuating the core lever, substantially as specified.

7. In a mold for manufacturing journal bearing liners, the combination with a fixed upright mold member, of a horizontally swinging mold member hinged thereto about an upright axis, said mold members having an upright gate extending lengthwise thereof and provided with a plurality of horizontal runways communicating with the interior of the mold at different levels, one of said mold members having means for securing it in an upright position substantially as specified.

8. In a mold for manufacturing journal bearing liners, the combination with a fixed upright mold member, of a horizontally swinging mold member hinged thereto about an upright axis, said mold members having an upright gate extending lengthwise thereof and provided with a plurality of horizontal runways communicating with the interior of the mold at different levels, and means for ejecting the liner cast therein, one of said mold members having means for securing it in an upright position substantially as specified.

9. In a mold for manufacturing journal bearing liners, a pair of opening and closing mold members hinged together about an upright axis and having an upright gate extending lengthwise of the mold and provided with a plurality of horizontal runners communicating with the interior of the mold at different levels, one of said mold members having means for securing it in an upright position substantially as specified.

HERMAN F. SCHRODER.

Witnesses:
GEORGE E. FOLK,
EDMUND ADCOCK.